(12) United States Patent
Learmonth

(10) Patent No.: US 6,834,277 B1
(45) Date of Patent: Dec. 21, 2004

(54) NORMALIZED TRANSACTION PROCESSING FOR SEARCH ENGINE

(75) Inventor: Gary Learmonth, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 269 days.

(21) Appl. No.: 09/778,299

(22) Filed: Feb. 6, 2001

(51) Int. Cl.[7] ............................................. G06F 17/30
(52) U.S. Cl. ..................... 707/2; 707/3; 707/8; 707/9; 707/10
(58) Field of Search .............................. 707/1, 2, 3, 4, 707/5, 6, 7, 8, 9, 10

(56) References Cited

U.S. PATENT DOCUMENTS

| | | | | |
|---|---|---|---|---|
| 5,161,223 A | * | 11/1992 | Abraham | 707/3 |
| 6,169,985 B1 | * | 1/2001 | Almgren et al. | 707/4 |
| 6,275,818 B1 | * | 8/2001 | Subramanian et al. | 707/2 |
| 6,338,055 B1 | * | 1/2002 | Hagmann et al. | 707/2 |
| 6,490,577 B1 | * | 12/2002 | Anwar | 707/3 |
| 6,640,218 B1 | * | 10/2003 | Golding et al. | 707/2 |

* cited by examiner

Primary Examiner—Shahid Alam
Assistant Examiner—Isaac M. Woo (57) ABSTRACT

An apparatus and method for transaction processing for a search transaction is disclosed. Search queries from users are received by an intermediate computing device. Each search query includes a user address and search criteria. The search criteria is normalized by the intermediate computing device to produce normalized search criteria. The normalized search criteria is then transmitted from the intermediate computing device to the search engine. The search engine performs a search using the normalized search criteria. The search engine then generates and sends a response to the intermediate computing device that includes search results. The intermediate computing device receives the results, generates responses to each search query using the receives search results, and sends responses to each user. In another embodiment, a software program is installed on the search engine computing device. The software program receives search queries from users and communicates with the search engine program for normalizing data.

14 Claims, 9 Drawing Sheets

NORMALIZED TRANSACTION PROCESSING FOR SEARCH ENGINE

TECHNICAL FIELD

This invention relates to the field of information services. More particularly, the present invention relates to a method and apparatus for transaction processing of search transactions.

BACKGROUND ART

Search engines are now widely used for providing responses to Internet search requests. Typically, in order to obtain an Internet search using a particular search engine, a user first accesses a server that provides a search engine web page. The web page includes spaces for input of search terms and may include provision for selecting one or more field of search. The use of a field of search provides for narrowing the scope of the search. Exemplary fields can include, for example, finance, travel, news, weather, history, etc.

The user then inputs search criteria (search terms and, optionally, a field of search). The user then completes and sends the search query. Typically, the search query is automatically completed and is sent when the user selects a button on the search engine web page that says "search" or when a user hits a return key.

The query, now in the form of a data packet that includes return address routing information and search criteria is then transmitted to the search engine. Once the query is received at the search engine, it is temporarily stored in a temporary storage register. The query is then processed by the search engine, resulting in a search of one or more databases using the received search criteria. The results of the database search are then transmitted back to the requesting user.

The results of the database search are typically transmitted back to the user in the form of a web page. Thus, upon completion of the database search, the search engine generates a web page that includes the results of the database search. Commonly, the results take the form of selectable links that are embedded in the web page. The new web page is then transmitted, via the Internet, back to the user. Search engines typically processes queries sequentially, on a first-in-first-out basis. Therefore the search engine individually addresses each incoming query. This can be quite inefficient, especially when numerous duplicative queries are received.

Recently, Internet usage has expanded significantly. This has put a significant demand on existing search engines. In order to meet this increasing demand, providers of search engines have been forced to increase the raw processing power of the search engine by upgrading the hardware of the search engine. Typically such upgrades involve the purchase of a new server that includes one or more fast processor and that includes a large cache for holding queries prior to processing. This can be quite expensive.

What is needed is a method and apparatus that will efficiently and cost effectively provide search services. In addition, what is needed is a method and apparatus that will allow for efficient and cost effective processing of search engine transactions. The method and apparatus of the present invention meets the above needs.

DISCLOSURE OF THE INVENTION

The method and apparatus of the present invention provides for efficiently and cost effectively providing search services. More particularly, the method and apparatus of the present invention provides for normalization of queries such that searches are more efficiently conducted.

An apparatus and method for providing search services is disclosed that includes an intermediate computing device that that is coupled to the Internet and that is coupled to a search engine. A software program operable on the intermediate computing device receives incoming queries.

The received queries are processed to obtain the submitted search criteria (the search terms and any included field of search terms) and the sender's IP address (user address). The search criteria and the user addresses are stored for a short period of time in a storage buffer. The search criteria are then normalized. The normalized search criteria are then transmitted to the search engine.

The search engine receives and processes the normalized search criteria to generate a response. This response is then transmitted back to the intermediate computing device. The intermediate computing device generates web pages corresponding to each received query which are then transmitted back to the user computing device.

In one embodiment, a normalizing program is disclosed that operates on the search engine computing device. In this embodiment, the normalizing program is operable to receive queries, normalize the search criteria from the received queries, and transmit normalized search criteria to the search engine program. The normalizing program then receives a response from the search engine program, generates a response to each received search query, and transmits the response to the user from which the query originated.

In yet another embodiment, the search engine is operable to generate responses to each search query and to send the response to the user from which the query originated.

The apparatus and methods of the present invention provide for normalizing of search criteria. Thereby unnecessary searches are eliminated. This results in a reduced number of searches by the search engine, improving efficiency of the search engine and the efficiency of the entire search transaction process. The methods and apparatus of the present invention obtain improved efficiency by normalizing data, resulting in cost effective processing of search transactions as compared to prior art methods of increasing processing power and/or caching abilities of the search engine.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "comparing", "calculating", "determining", "normalizing", "transmitting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
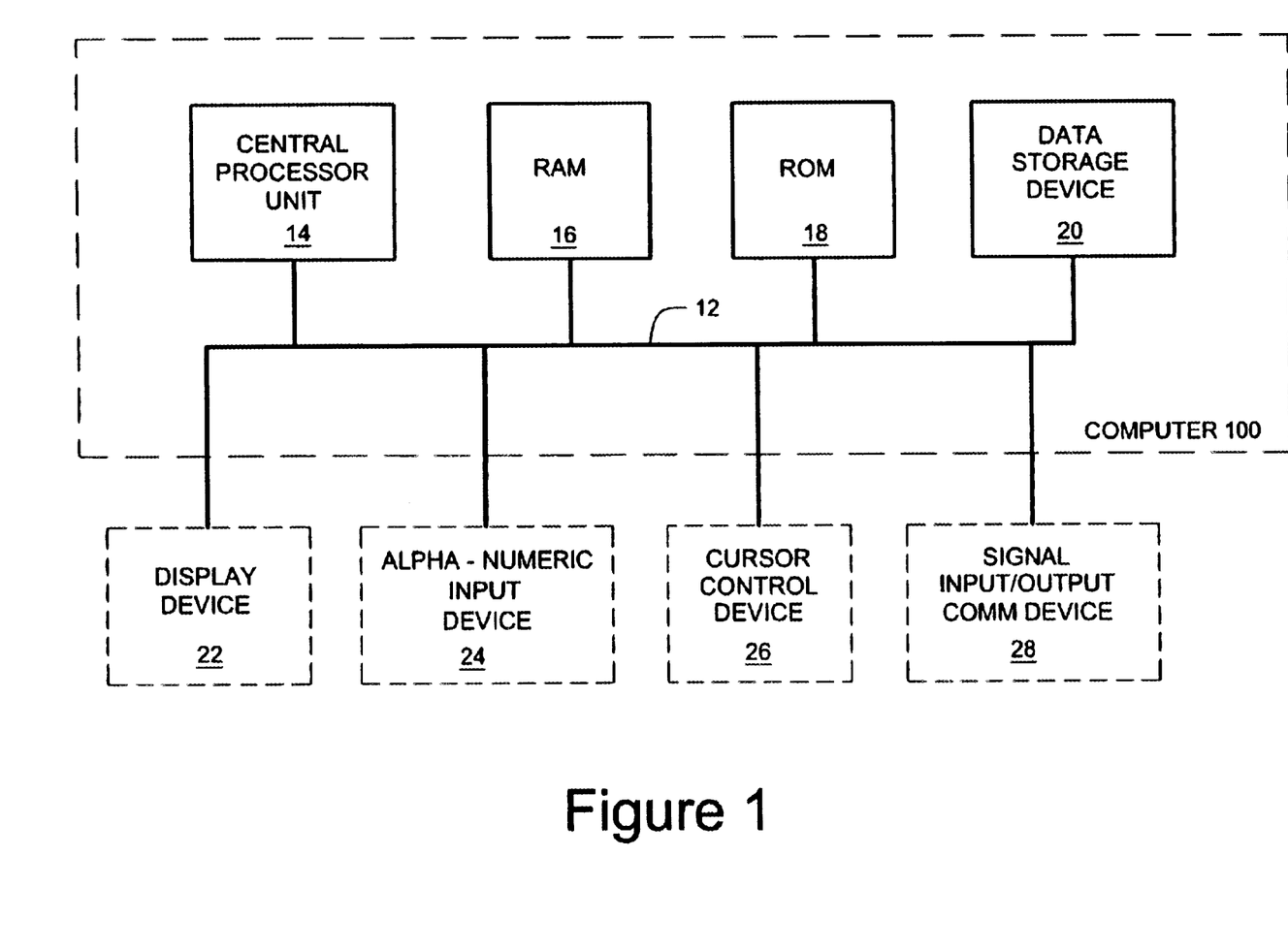
FIG. 1 is a schematic diagram of an exemplary computer system used as a part of a system for providing search services in accordance with one embodiment of the present invention.

With reference now to FIG. 1, portions of the method and apparatus for transaction processing of a search transaction of the present invention are comprised of computer executable instructions which may reside in a computer system. FIG. 1 illustrates an exemplary computer system 100 used for performing transaction processing of a search transaction in accordance with the present invention. It is appreciated that computer system 100 of FIG. 1 is exemplary only and that the present invention can operate within other types of computer systems.

Computer system 100 of FIG. 1 includes an address/data bus 12 for communicating information, a central processor unit 14 coupled to bus 12 for processing information and instructions. Computer system 100 also includes data storage features such as a Random Access Memory (RAM) 16 coupled to bus 12 for storing information and instructions for central processor unit 14, a Read Only Memory (ROM) 18 coupled to bus 12 for storing static information and instructions for the central processor unit 14, and a data storage device 20 (e.g., a magnetic or optical disk and disk drive) coupled to bus 12 for storing information and instructions. Computer system 100 of the present embodiment also includes an optional display device 22 coupled to bus 12 for displaying information to a computer operator. An optional alphanumeric input device 24 including alphanumeric and function keys and an optional cursor control device 26 are shown to be coupled to bus 12 for communicating information and command selections to central processor unit 14.

Display device 22 of FIG. 1, utilized with computer system 100 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands. Computer system 100 also can include an optional signal input/output communication device 28 (e.g. a modem or other network connection device) coupled to bus 12 for communicating with other devices and systems.

Detailed Description of the Structure of the Present Invention

Figure 2:
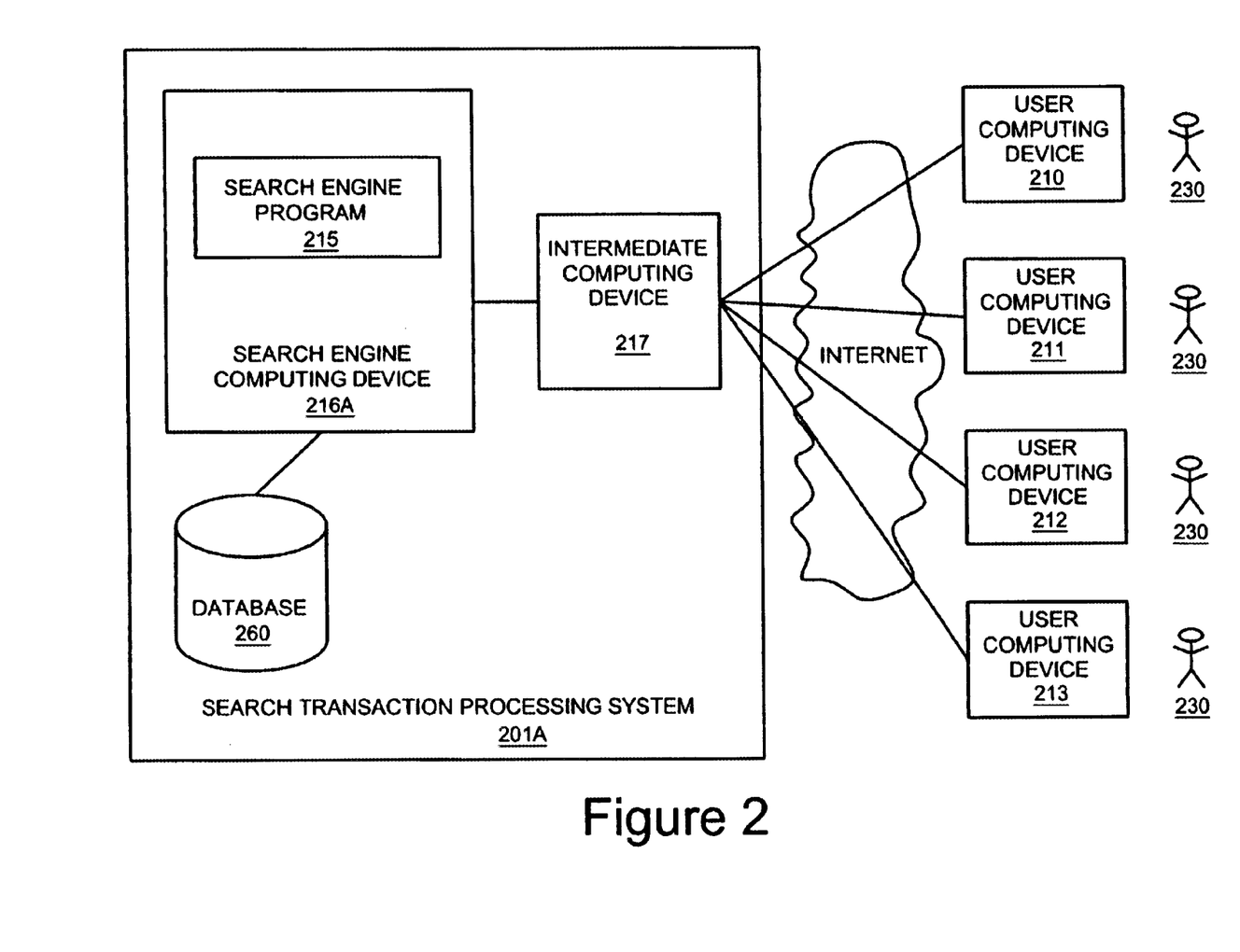
FIG. 2 is a schematic diagram that illustrates a search transaction processing system that includes an intermediate computing system that couples to a search engine computing device and that couples to users via the Internet in accordance with one embodiment of the present invention.

With reference now to FIG. 2, a search transaction processing system 201a is shown in accordance with one embodiment of the present invention. User computing devices 210–213 communicate with the search engine that includes search engine program 215 operable on search engine computing devices 215 via intermediate computing device (e.g., a server) 217. In one embodiment, computing devices 210–213 and computing devices 216a–217, are personal computers (or servers). However, the present invention is also well suited to an embodiment in which computing devices 210–213 are comprised of other communication devices such as, for example, Internet telephone appliances, personal digital assistants, handheld computers, and the like. Computing devices 210–213 and 216a–217 of the present embodiment may contain, for example, some or all of the features of computer system 100 described above in detail in conjunction with FIG. 1.

In one embodiment, intermediate computing device 217 is directly coupled to search engine computing device 216a and database 260 is directly coupled to search engine computing device 216a. However, alternatively, search engine computing device 216a, intermediate computing device 217, and database 260 are coupled together via a local area network (LAN). In yet another embodiment, search engine computing device 216a, intermediate computing device 217, and database 260 are located at different geographic locations and communicate via a more geographically dispersed network system such as, for example a wide are network (WAN).

Figure 3:
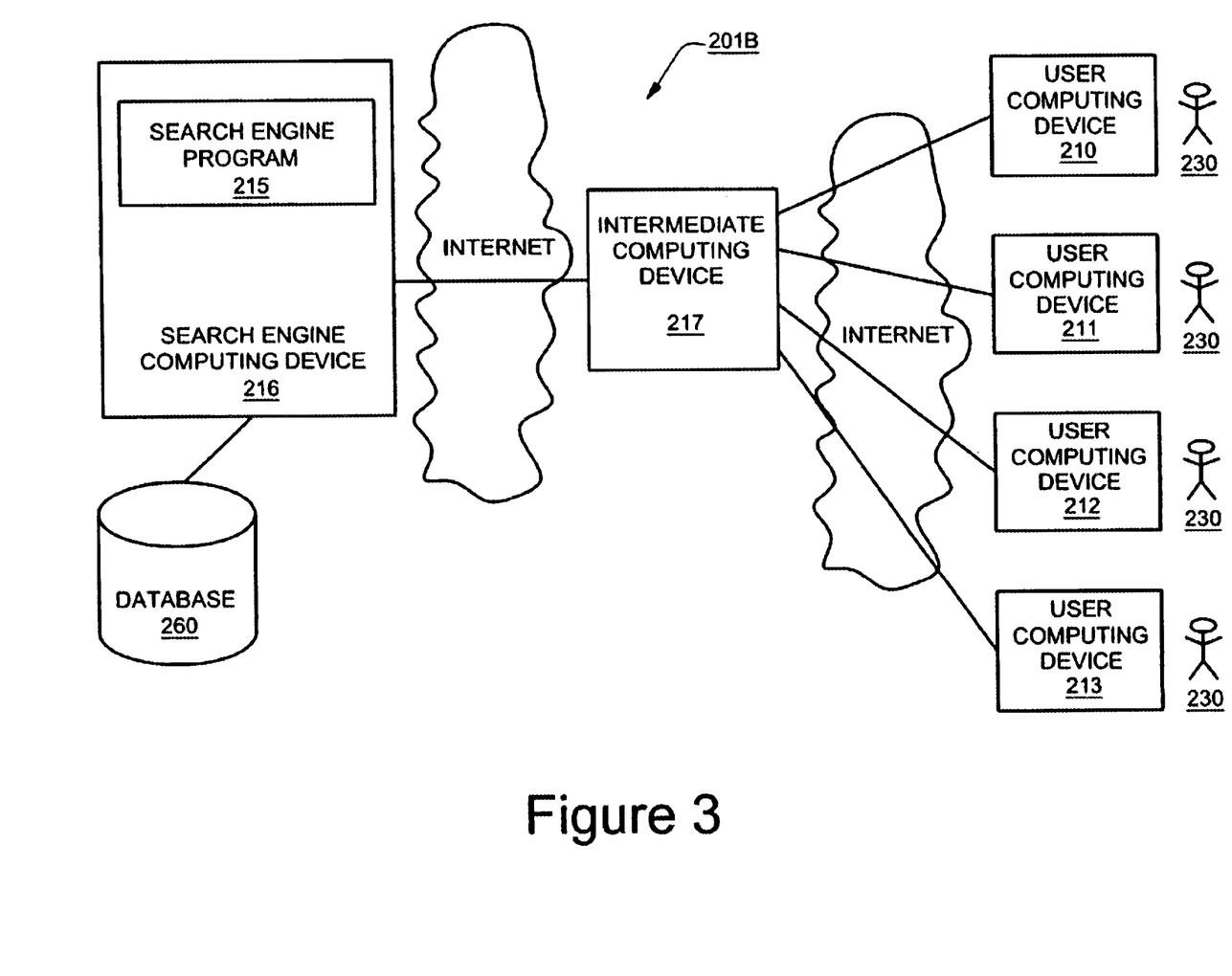
FIG. 3 is a schematic diagram that illustrates a search transaction processing system that includes an intermediate computing system that couples via the Internet to a search engine computing device and that couples to users via the Internet in accordance with one embodiment of the present invention.

FIG. 3 shows an alternate embodiment that includes search engine transaction processing system 201b. In this embodiment, the search engine formed by search engine program 215 and computing device 216a is coupled to intermediate computing device 217 via the Internet.

Figure 4:
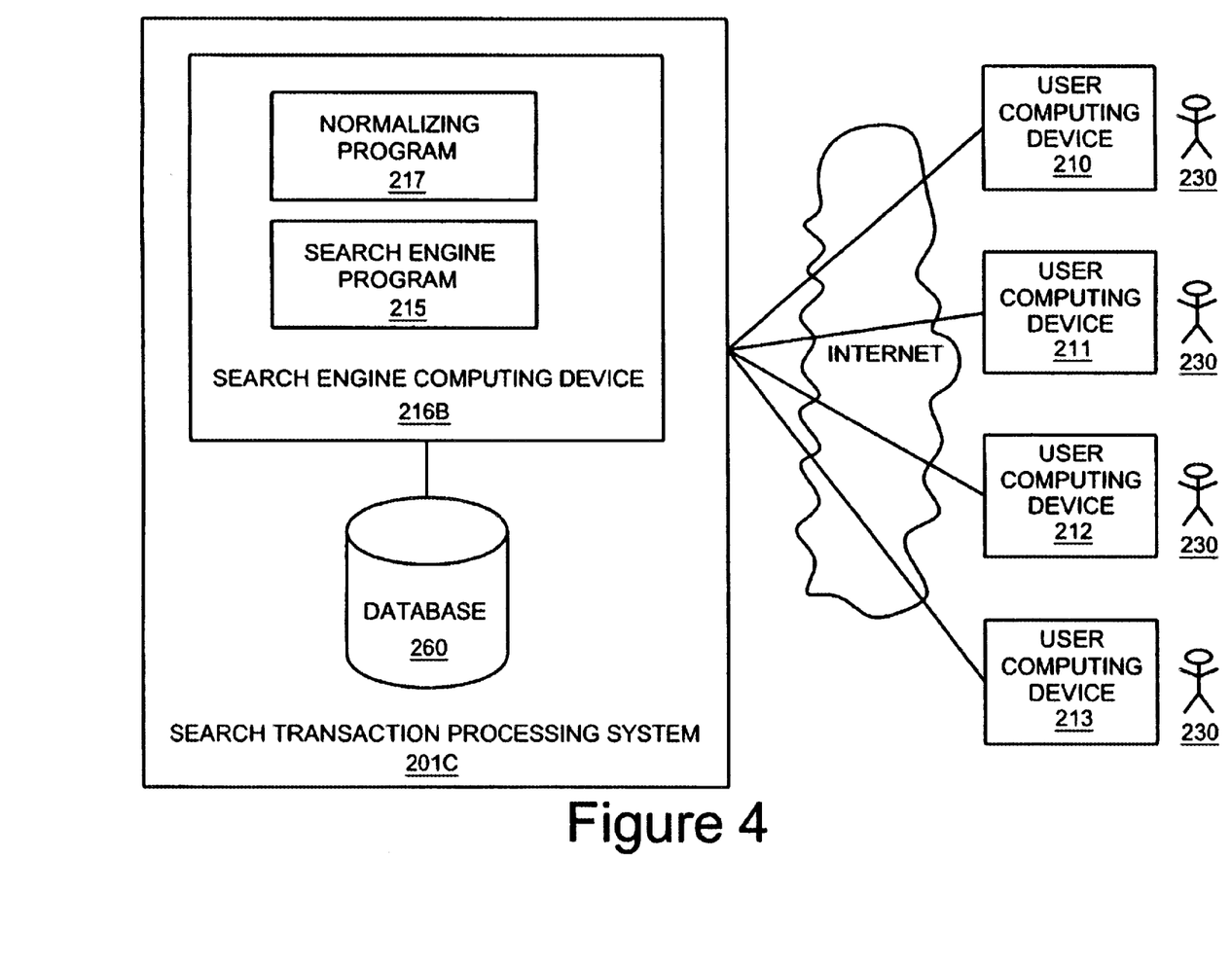
FIG. 4 is a schematic diagram that illustrates a search transaction processing system that includes a normalizing program that is installed on a search engine computing device and that couples to users via the Internet in accordance with one embodiment of the present invention.

In the embodiment shown in FIG. 4, search transaction processing system 201c includes a normalizing program 417 that is operable on search engine computing device 216b. In this embodiment, user computing devices 210–213 communicate directly with search engine computing device 216b. In one embodiment, normalizing program 417 includes functional modules 501–504 of FIG. 5.

Database 260 of FIGS. 2–4 is shown to be coupled to search engine computing device 216a–216b. In the present embodiment, database 260 includes an extensive database that can be searched by search engine computing device 216a–216b of FIGS. 2–4. Though database 260 is shown to be a single database, alternatively, database 260 could include multiple databases (not shown). In addition, though database 260 is shown to be directly coupled to one of search engine computing devices 216a–216b, alternatively, database 260 can be coupled to search engine computing devices 216a–216b of FIGS. 2–4 via a LAN, a WAN, or via the Internet.

In the embodiments shown in FIGS. 2–4, it is appreciated that, although only four user computing devices 210–213 are shown for purposes of clarity, the present invention is also well suited to a system having a greater or lesser number of user computing devices. Similarly, it is appreciated that the search transaction processing system 201 of FIGS. 2–4 could include multiple search engine computing devices 216a–216b and/or multiple intermediate computing systems 217. In one embodiment, the search transition processing system 201a–201c includes a multi-level network of servers.

In the embodiments shown in FIGS. 2–4, user computing devices 210–213 are shown to be coupled to search transaction processing system 201a–201c via the Internet. However, user computing devices 210–213 are well adapted to couple to search transaction processing system 201a–201c via other means such as, for example, direct telephone communication, cellular telephone, direct radio link, satellite communication, pager network, etc. Also, computing devices 210–213 and search transaction processing system 201a–201c can connect to the Internet either directly or indirectly (e.g. through a LAN, a WAN, or a dedicated telephone switching system).

Figure 5:
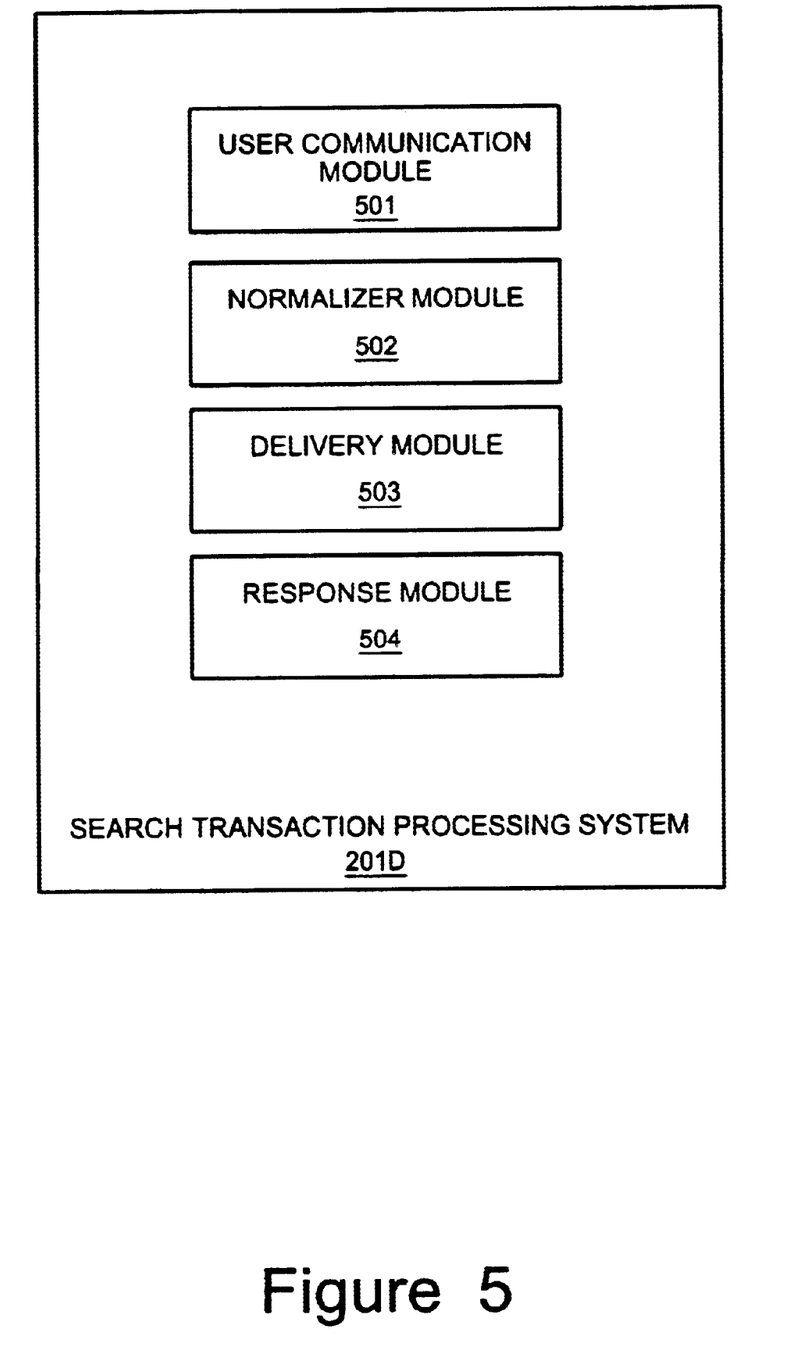
FIG. 5 is a schematic diagram of components of a normalizing program in accordance with one embodiment of the present invention.

Referring now to FIG. 5, search transaction processing system 201d is shown to include functional modules 501–504. In one embodiment functional components 501–504 are implemented as software components that are operable on computing devices 216a–217 of FIGS. 2–4. In one embodiment, these software programs are written in an Internet website development languages such as, for example, ActiveX or Java. In the present embodiment, functional components 501–504 include one or more software program installed on server 217 and can include one or more software program that is operable on search engine computing device 216a–216b.

Continuing with FIG. 5, user communication module 501 is a functional module that is operable to receive communications from users and is operable to control communication operations that are connected with communications received from users. In the present embodiment, user communication module 501 includes logic for analyzing incoming communications so as to obtain search criteria (e.g., search terms, field of search) and a return IP addresses (user address) from received search queries. In the present embodiment, user communication module 501 is adapted to store search criteria and user addresses received from users.

Normalizer module 502 of FIG. 5 is a functional module that is operable to compare and normalize data within incoming communications from users. In the present embodiment, normalizer module 502 normalizes search criteria to obtain normalized search criteria. In the present embodiment, normalizer module 502 compares the search criteria from each received query and determines commonalities between the search criteria. Normalizer module 502 then generates normalized search criteria. The normalization process removes redundant search criteria and hence, eliminates redundant searches.

Continuing with FIG. 5, delivery module 503 is a functional module that is operable to compose the modulated data into a message and transmit the message to search engine program 215 of FIGS. 2–4. This transmission may be internal to a single computing device (e.g., search engine computing device 216b of FIG. 4) or may be between two different computing devices (e.g., from intermediate computing device 217 to search engine computing device 216a as shown in FIGS. 2–3). Delivery module 503 is also operable to receive responses from a search engine.

Response module 504 of FIG. 5 is a functional module that is operable to construct a response and to send the response to the user computing device from which the request originated. In the present embodiment, response module 504 associates the received responses from the search engine with the associated incoming messages from users and constructs a response. In one embodiment, the response is in the form of a web page that includes search results in the form of executable links.

Detailed Description of the Operation of the Present Invention

Figure 6:
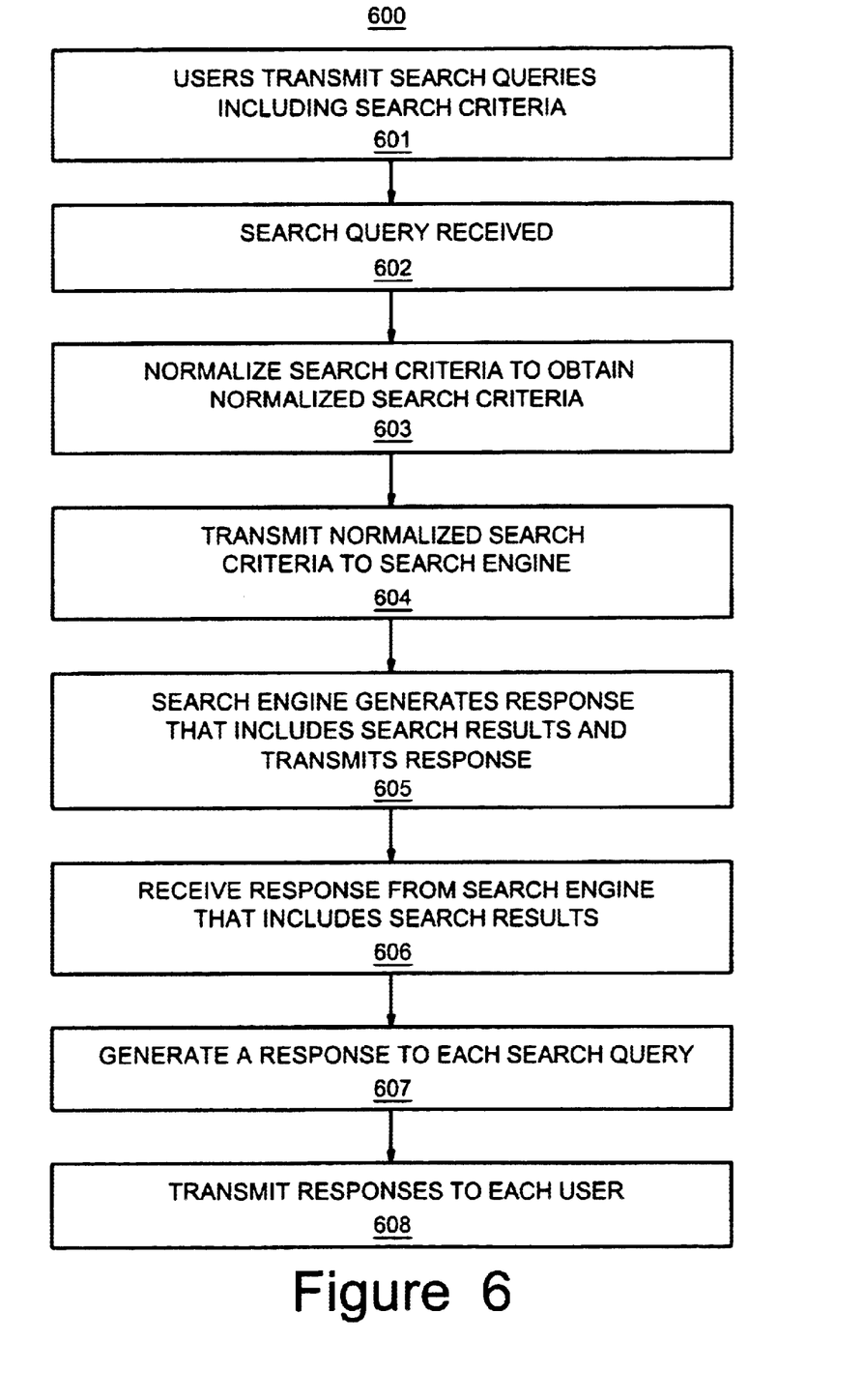
FIG. 6 is a flow chart of a method for transaction processing of a search transaction in accordance with one embodiment of the present invention.
Figure 7:
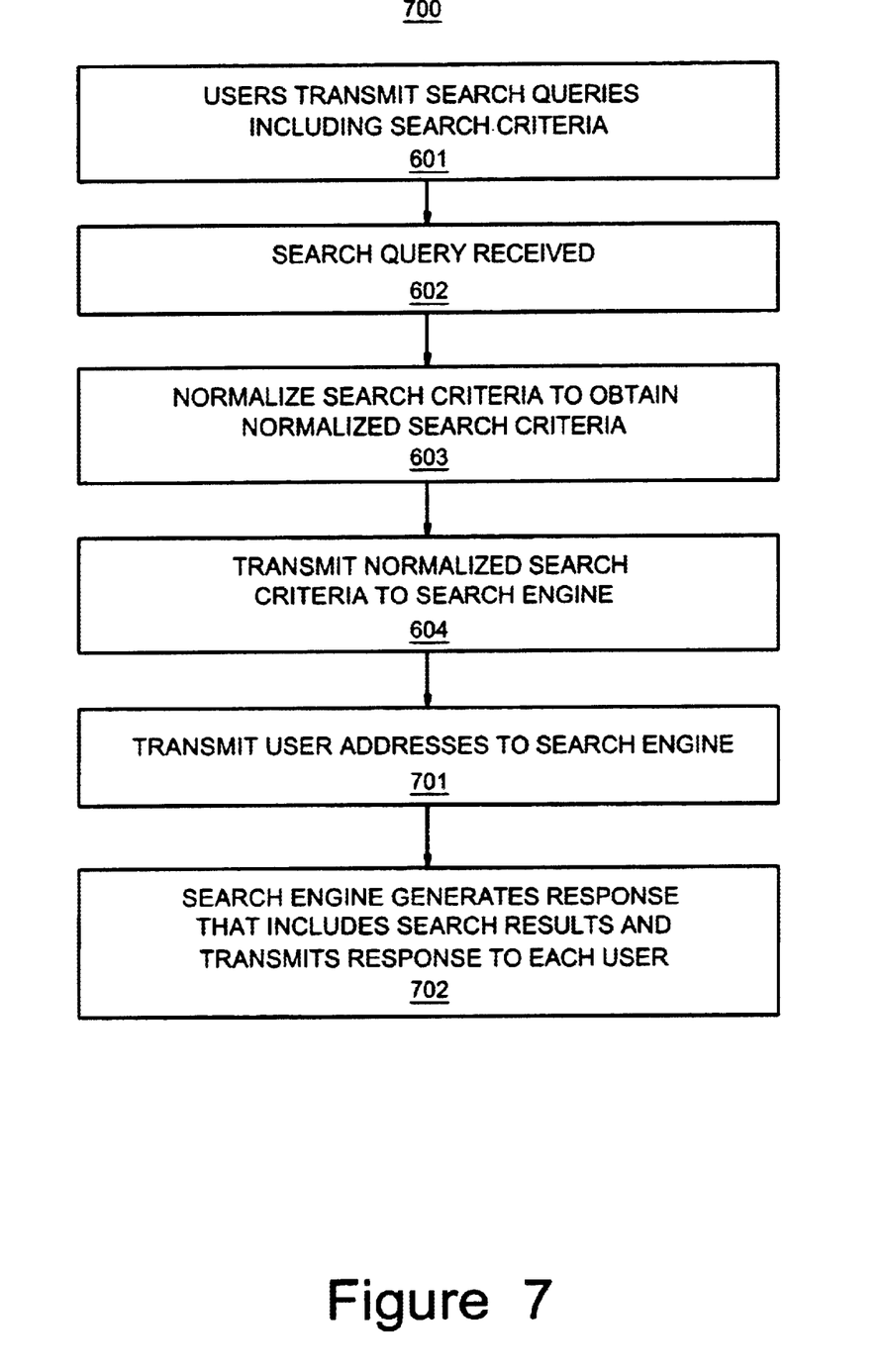
FIG. 7 is a flow chart of a method for transaction processing of a search transaction in which the search engine transmits responses to each user in accordance with one embodiment of the present invention.

With reference next to FIGS. 6–7, flow charts 600 and 700 show exemplary steps used by the present invention. Flow charts 600 and 700 include processes of the present invention which, in one embodiment, are carried out by a processor under the control of computer-readable and computer-executable instructions. The computer-readable and computer-executable instructions reside, for example, in data storage features such as computer usable volatile memory 16 and/or computer usable non-volatile memory 18 of FIG. 1. The computer-readable and computer-executable instructions are used to control or operate in conjunction with, for example, central processing unit 14 of FIG. 1. As mentioned above, the features of the computer system of FIG. 1 are well suited to being disposed, for example, in intermediate computing device 217 and/or search engine computing device 216a–216b. Although specific steps are disclosed in flow charts 600 and 700 such steps are exemplary. That is, the present invention is well suited to performing various other steps or variations of the steps recited in FIGS. 6–7.

Referring now to FIG. 6, users transmit search queries that include search criteria as shown by step 601. In the embodiments illustrated in FIGS. 2–4, users 230 transmit search queries by the operation of user computing devices 210–213. In one embodiment, user computing devices 210–213 are operable to display a web page that is a search request transmission form. This web page can be generated by search engine computing device 216a–216b, by intermediate computing device 217, or by other sites. In one embodiment, the search request transmission form includes provision for receiving search terms. In order to generate a search, the user 230 types the desired search term or terms into user computing device 210–213. The search query is then transmitted by selecting an icon displayed on the search request transmission form marked "search" or by hitting enter or return keys. In one embodiment, the search criteria can include a field of search. That is, in one embodiment, the user can narrow the search by selecting a field of search from a listing of suggested fields of search.

The search queries transmitted in step 601 are then received as shown by step 602. In the embodiment shown in FIGS. 2–3, the search queries are received by intermediate computing device 217. In the embodiment shown in FIG. 4, the search queries are received by normalizing program 417 operable on search engine computing device 216b.

Continuing with step 602, in one embodiment, some or all of the data from the search queries transmitted in step 601 are temporarily stored. In one embodiment, data is stored in RAM 16 of FIG. 1. In the embodiments shown in FIGS. 2–3, data is stored in intermediate computing device 217.

As shown by step 603, search criteria is normalized to obtain normalized search criteria. More particularly, the search criteria received in step 602 are normalized. In the present embodiment, normalization includes comparing the search criteria from each received query and determining commonalities between the search criteria, and generating normalized search criteria that is consolidated based on the commonalities determined to exist between the search criteria. Thereby, redundant search criteria are removed.

The normalized search criteria are then transmitted to the search engine as shown by step 604. In the embodiments shown in FIGS. 2–3, the search queries transmitted from intermediate computing device 217 to search engine computing device 216a. In the embodiment shown in FIG. 4, the search queries are transmitted from normalizing program 417 to search engine program 215. In the embodiment shown in FIGS. 2–3, a return address is also transmitted.

Referring now to step 605, the search engine then generates a response that includes search results and transmits the response. In the embodiment shown in FIGS. 2–4, the search engine formed by search engine program 215 operable on search engine computing device 216a–216b generates a response by searching database 260 for search results relating to the normalized search criteria. In the embodiment shown in FIGS. 2–3, the response is transmitted from search engine computing device 216a to intermediate computing device 217 using the return address submitted in step 604. In the embodiment shown in FIG. 4, the response is transmitted from search engine program 215 to normalizing program 417.

As shown by step 606, the response is received from the search engine. That is, in the embodiment shown in FIGS. 2–3, the response is received at intermediate computing device 217. In the embodiment shown in FIG. 4, the response is received by normalizing program 417.

Referring now to step 607, a response to each search query is generated. More particularly, a response is generated to each search query received in step 602. In one embodiment, the search results received in step 607 are associated with each search query received in step 602 to construct a response to each search query received in step 602. The response includes that portion of the received search results that gives the results relating to the submitted search Continuing with FIG. 6, as shown by step 608, the response is transmitted to each user. More particularly, in the embodiment shown in FIGS. 2–3, the response is transmitted from intermediate computing device 217 to the user computing device 210–213 from which the search query originated. In the embodiment shown in FIG. 4, the response is transmitted from normalizing program 417, operable on search engine computing device 216b to the user computing device 210–213 from which the search query originated. In the present embodiment, the user address received in step 602 is used to determine the address to which each response is to be sent.

Figure 8:
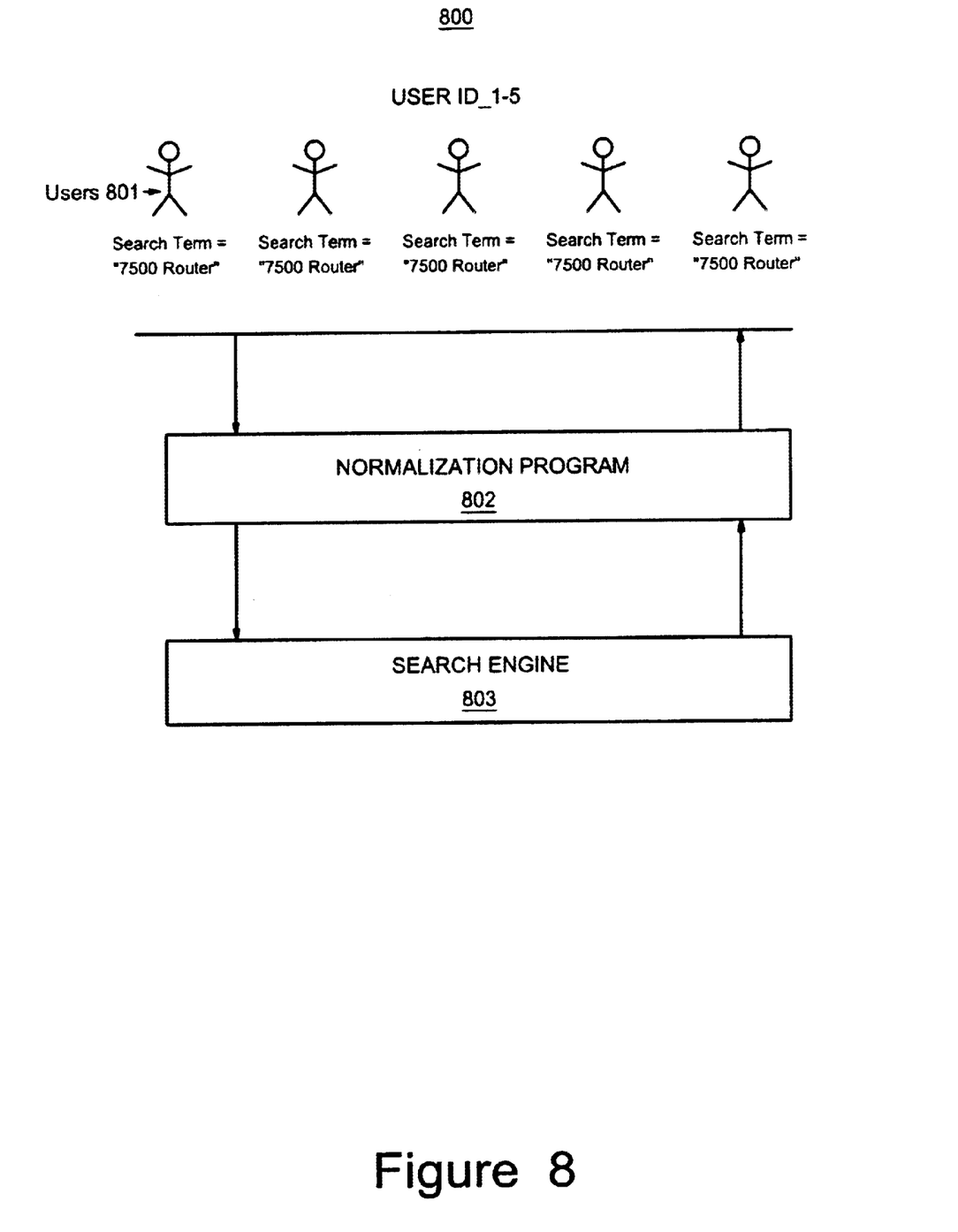
FIG. 8 is a diagram illustrating the steps of method 600 of FIG. 6 using exemplary queries from users that are normalized by a normalization program in accordance with one embodiment of the present invention.

Referring now to FIG. 8, method 600 is illustrated using exemplary queries from users 801. In this embodiment, each of users 801 has submitted a query (step 601) that includes identical search criteria of "7500 router." Normalization program 802 receives the search queries from each of the users 801 (step 602). The search criteria is normalized (step 603) so as to obtain a single normalized search criteria of "7500 router" which is transmitted to search engine 803 (step 604). Search engine 803 responds to the single query with a single response that is transmitted to normalization program 802 (step 605). Then normalization program 802 receives the response from search engine 803 (step 606) and generates (step 607) and transmits (step 608) a response to each of users 801.

In an alternate embodiment of the present invention that is shown in FIG. 7, the search engine is operable to generate and transmit the response to each user. As in the embodiment of FIG. 6, users transmit search queries (step 601) which are received (step 602) and which are normalized (step 603) to obtain normalized search criteria which is then transmitted to the search engine (step 604).

Referring now to step 701, user addresses are transmitted to the search engine. In the embodiments shown in FIGS. 2–3, the user addresses are transmitted from intermediate computing device 217 to search engine computing device 216a. In the embodiment shown in FIG. 4, the user addresses are transmitted from normalizing program 417 to search engine program 215.

Referring now to step 702, the search engine then generates a response that includes the search results and transmits the response to each user. In the embodiment shown in FIGS. 2–4, the search engine formed by search engine program 215 operable on search engine computing device 216a–216b generates a response by searching database 260 for search results relating to the normalized search criteria. In the embodiment shown in FIGS. 2–3, the response is transmitted from search engine computing device 216a to the user computing device 210–213 from which the search query originated. In the embodiment shown in FIG. 4, the response is transmitted from search engine program 215 to the user computing device 210–213 from which the search query originated.

Figure 9:
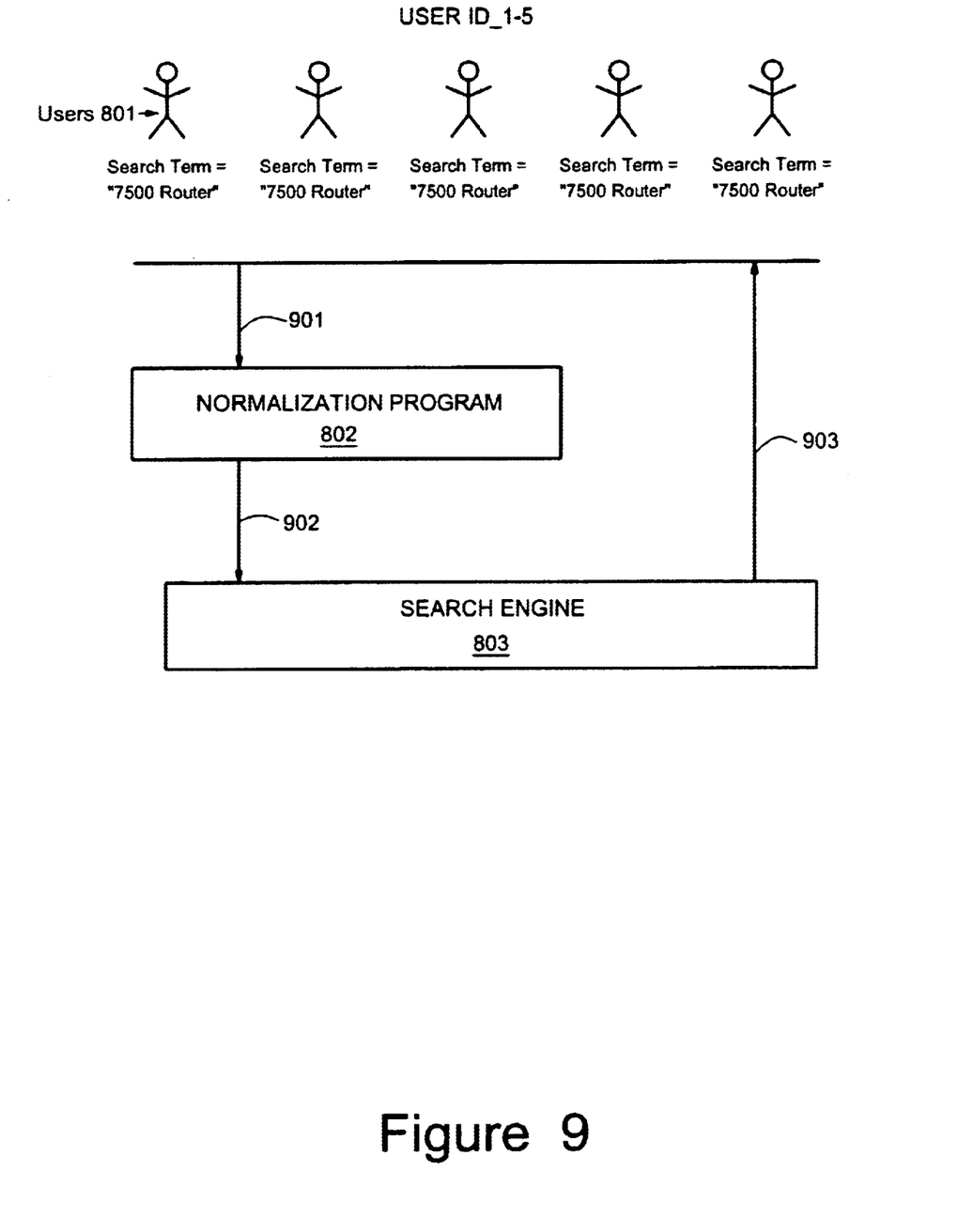
FIG. 9 is a diagram illustrating the steps of method 700 of FIG. 7 using exemplary queries from users that are normalized by a normalization program in accordance with one embodiment of the present invention.

Referring now to FIG. 9, method 700 of FIG. 7 is illustrated using exemplary queries from users 801. In this embodiment, each of users 801 has submitted a query (step 601) that includes identical search criteria of "7500 router" as indicated by line 901. Normalization program 802 receives the search queries from each of the users 801 (step 602). The search criteria is normalized (step 603) so as to obtain a single normalized search criteria of "7500 router." The single normalized search (step 604) and the user address for each of users 801 are transmitted (step 701) to search engine 803 as indicated by line 902. Search engine 803 responds by conducting a single search to obtain search results that are included in responses that are sent from search engine 803 to each of users 801 (step 702) as indicated by line 903.

The terms "normalize" and "normalization" as used in the present Application include those techniques used during logical data modeling to ensure that there is only one way to know a fact, by removing all structures that provide more than one way to know the same fact as can be represented in a database relation (table). The terms "normalize" and "normalization," as used in the present Application, include all of the six generally recognized normal forms of a relation: first normal form, second normal form, third normal form, Boyce/Codd normal form, fourth normal form, and fifth normal form, also called projection/join normal form as well as other known normal forms (e.g., Domain/Key).

The goal of normalization is to control and eliminate redundancy, and mitigate the effects of modification anomalies—which are generally insertion and deletion anomalies. (Insertion anomalies occur when the storage of information about one attribute requires additional information about a second attribute. Deletion anomalies occur when the deletion of one fact results in the loss of a second fact). Following is a discussion of some of the more common forms of normalization.

In the First normal form all attributes must be atomic. That is, there can exist no repeating groups in an attribute. For example, in a relation that describes a student, the student's classes should not be stored in one field, separated by commas. Rather, the classes should be moved to their own relation, which should include a link back to the student relation (called a foreign key). Repeating groups in the present Application can include the query or partial query text submitted by each user. The foreign key in this case would be user or session id's linking back to the query text. The relation is the relation between users and queries.

A relation is in second normal form if it is in first normal form and each attribute is fully functionally dependent on the entire primary key. That is, no subset of the key can determine an attribute's value. In the present Application, the query text is fully functionally dependent on the entire primary key since the primary key in this case is not a composite one and thus has no subset.

A relation is in third normal form if it is in second normal form and each non-key attribute is fully functionally dependent on the entire primary key, and not on any other non-key attribute. That is, no transitive dependencies exist among the attributes.

A relation is in Boyce-Codd normal form if it is in third normal form and all candidate keys defined for the relation satisfy the test for the third normal form.

The fourth normal form provides that there should not exist any nontrivial multivalued dependencies in a relation. To move from the Boyce-Codd normal form to the fourth normal form, remove any independently multivalued components of the primary key to two new parent entities. For example, if an employee can have many skills and many dependents, move the skill and dependent information to separate tables since they repeat AND since they are independent of each other.

The fifth normal form defines a goal to be reached, rather than the resolution of a particular anomaly. The goal to be reached with the fifth normal form is to keep splitting the tables until either of two states is reached: 1) further splitting would result in tables that could NOT be joined to recreate the original; or 2), the only splits left are trivial.

The apparatus and methods of the present invention provide for normalizing of search criteria. Thereby unnecessary searches are eliminated. This results in a reduced number of searches by the search engine, improving efficiency of the search engine and the efficiency of the entire search transaction process. The methods and apparatus of the present invention obtain improved efficiency by normalizing data, resulting in cost effective processing of search transactions as compared to prior art methods of increasing processing power and/or caching abilities of the search engine.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for transaction processing of a search transaction comprising the steps of:
   a) receiving a plurality of search queries from users, each of said plurality of search queries including search criteria and including a user address;
   b) normalizing said search criteria so as to obtain a single normalized search criteria for said plurality of search queries;

c) transmitting said single normalized search criteria to a search engine;

d) receiving a response from said search engine that includes search results;

e) generating a response to each of said search queries from users, each response including search results corresponding to the search criteria submitted by that particular user; and f) transmitting said responses to each of said users, wherein step b) further comprises:

b1) comparing said search criteria from each of said queries;

b2) determining commonalities between said search criteria; and b3) generating normalized search criteria, said normalized search criteria consolidated based on the commonalities determined in step b2) so as to eliminate redundant search criteria.

2. The method of claim 1 wherein said search engine is a software program operable on a first computing device, said steps a)–c) performed by a second computing device that is coupled to said first computing device.

3. The method of claim 2 wherein said first computing device is coupled to said second computing device using a local area network.

4. The method of claim 2 wherein said first computing device is coupled to said second computing device using a wide area network.

5. The method of claim 2 wherein said first computing device is coupled to said second computing device via the Internet.

6. The method of claim 1 wherein said search engine is a first software program operable on a first computing device, said steps a)–c) performed by a second software program operable on said first computing device.

7. The method of claim 1, wherein said c) further comprises transmitting said user addresses to said search engine.

8. The method of claim 7 wherein the search engine is operable to generate search results and to generate a response to each of said search queries using said user addresses, said response transmitted from said search engine to each of said users.

9. In a computer system including a processor coupled to a bus, and a memory unit coupled to the bus for storing information, a computer-implemented method for communicating with a user comprising the steps of:

a) receiving a plurality of search queries from users, each of said plurality of search queries including search criteria and including a user address;

b) normalizing said search criteria so as to obtain a single normalized search criteria for said plurality of search queries;

c) transmitting said single normalized search criteria to a search engine;

d) receiving a response from said search engine that includes search results;

e) generating a response to each of said search queries from users, each response including search results corresponding to the search criteria submitted by that particular user; and f) transmitting said responses to each of said users, wherein step b) further comprises:

b1) comparing said search criteria from each of said queries;

b2) determining commonalities between said search criteria; and b3) generating normalized search criteria, said normalized search criteria consolidated based on the commonalities determined in step b2) so as to eliminate redundant search criteria.

10. The computer-implemented method of claim 9 wherein said c) further comprises transmitting said user addresses to said search engine.

11. The computer-implemented method of claim 10 wherein the search engine is operable to generate search results and to generate a response to each of said search queries using said user addresses, said response transmitted from said search engine to each of said users.

12. A system for transaction processing of a search transaction comprising:

a) a first computing system including a search engine program operable to search a database;

b) a second computing system including at least one computing device that is coupled to the Internet, said second computing system coupled to said first computing system; and c) a software program operable on said first computing device for receiving a plurality of search queries from users, each of said plurality of search queries including search criteria and including a user address, said software program operable to normalize said search criteria so as to obtain a single normalized search criteria for said pluralities of search queries and operable to transmit said normalized search criteria to said first computing system, wherein the software program is operable to receive a response from said first computing device that includes search results, and is operable to generate a response to each of said search queries from users, each response including search results corresponding to the search criteria submitted by that particular user, and is operable to transmit said responses to each of said users, wherein step b) further comprises:

b1) comparing said search criteria from each of said queries;

b2) determining commonalities between said search criteria; and b3) generating normalized search criteria, said normalized search criteria consolidated based on the commonalities determined in step b2) so as to eliminate redundant search criteria.

13. In a computer system having a processor coupled to a bus, a computer readable medium coupled to said bus and having stored therein a computer program that when executed by said processor causes said computer system to implement a method for transaction processing of a search transaction, said method comprising the steps of:

a) receiving a plurality of search queries from users, each of said plurality of search queries including search criteria and including a user address;

b) normalizing said search criteria so as to obtain a single normalized search criteria for said plurality of search queries;

c) transmitting said single normalized search criteria to a search engine;

d) receiving a response from said search engine that includes search results;

e) generating a response to each of said search queries from users, each response including search results corresponding to the search criteria submitted by that particular user; and f) transmitting said responses to each of said users, wherein step b) of said computer implemented method stored on said computer readable medium further comprises the steps of:
 b1) comparing said search criteria from each of said queries;
 b2) determining commonalities between said search criteria; and
 b3) generating normalized search criteria, said normalized search criteria consolidated based on the commonalities determined in step b2) so as to eliminate redundant search criteria.

14. The computer readable medium of claim 13 wherein said search engine is a software program operable on a first computing device, said steps a)–c) performed by a second computing device that is coupled to said first computing device.

* * * * *